(12) United States Patent
Chatain

(10) Patent No.: US 9,583,892 B2
(45) Date of Patent: Feb. 28, 2017

(54) AIRCRAFT HAVING AN AVIONICS SYSTEM INCLUDING AVIONICS EQUIPMENT THAT HAS PRIMARY LIGHTNING PROTECTOR AND IS CONNECTED IN SERIES VIA WIRED CONNECTION TO SUPPLEMENTAL LIGHTNING PROTECTOR

(71) Applicant: AIRBUS HELICOPTERS, Marignane (FR)

(72) Inventor: Bertrand Chatain, Vitrolles (FR)

(73) Assignee: Airbus Helicopters, Marignane (FR)

( * ) Notice: Subject to any disclaimer, the term of this patent is extended or adjusted under 35 U.S.C. 154(b) by 72 days.

(21) Appl. No.: 14/643,073

(22) Filed: Mar. 10, 2015

(65) Prior Publication Data

US 2015/0270651 A1 Sep. 24, 2015

(30) Foreign Application Priority Data

Mar. 20, 2014 (FR) ..................................... 14 00667

(51) Int. Cl.
| | | |
|---|---|---|
| *G01R 31/08* | (2006.01) | |
| *H01R 24/20* | (2011.01) | |
| *H02H 9/04* | (2006.01) | |
| *H01R 13/66* | (2006.01) | |
| *B64D 45/02* | (2006.01) | |

(52) U.S. Cl.
CPC ......... *H01R 13/6666* (2013.01); *B64D 45/02* (2013.01); *H01R 13/6616* (2013.01); *H02H 9/04* (2013.01); *H01R 24/20* (2013.01); *H01R 2201/26* (2013.01)

(58) Field of Classification Search
CPC ............ H01R 13/6666; H01R 13/6616; H01R 2201/26; H01R 24/20; H02H 9/04; B64D 45/02

USPC .......................................... 324/520; 361/118
See application file for complete search history.

(56) References Cited

U.S. PATENT DOCUMENTS

| | | |
|---|---|---|
| 5,846,099 A | 12/1998 | Hiruma et al. |
| 2003/0179533 A1 | 9/2003 | Jones et al. |
| 2010/0123591 A1 | 5/2010 | Bauschke et al. |
| 2010/0127193 A1 | 5/2010 | Abernathy et al. |
| 2013/0171852 A1 | 7/2013 | Todd et al. |

FOREIGN PATENT DOCUMENTS

| | | |
|---|---|---|
| EP | 0512927 | 7/1995 |
| EP | 2551771 | 1/2013 |

OTHER PUBLICATIONS

French Search Report for FR 1400667, Completed by the French Patent Office on Nov. 21, 2014, 7 Pages.

*Primary Examiner* — Billy Lactaoen
(74) *Attorney, Agent, or Firm* — Brooks Kushman P.C.

(57) ABSTRACT

An aircraft having an avionics system comprising a plurality of avionics equipment and a system of connections, the avionics equipment incorporating protection means for providing protection against indirect effects of lightning, the system of connections including wired connections and connectors between the wired connections. The avionics system has at least one avionics equipment with protection means that are insufficient for providing total protection against the indirect effects of lightning when the equipment is incorporated in the structure, which equipment is connected to at least one connector including a resistor connected in series relative to at least one wired connection secured to the resistive connector.

15 Claims, 1 Drawing Sheet

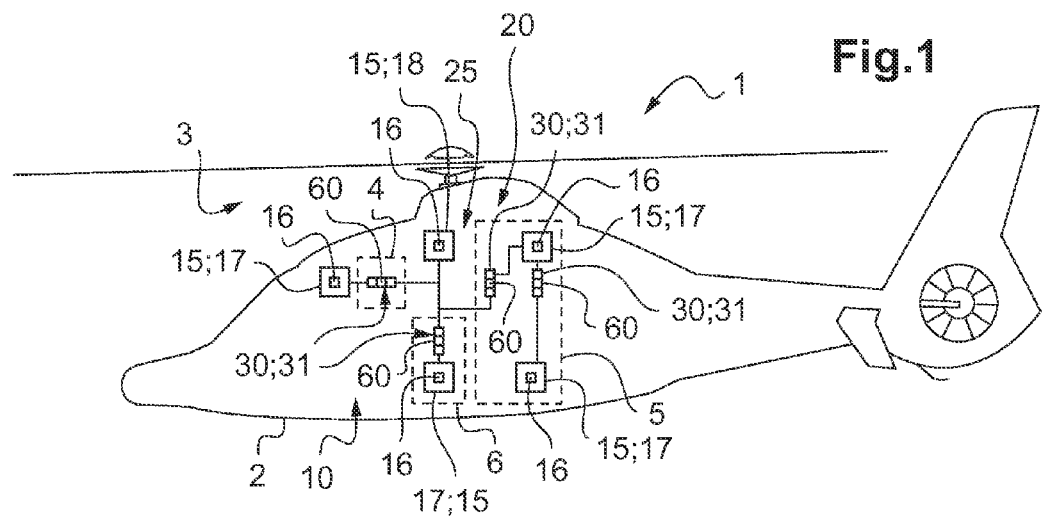
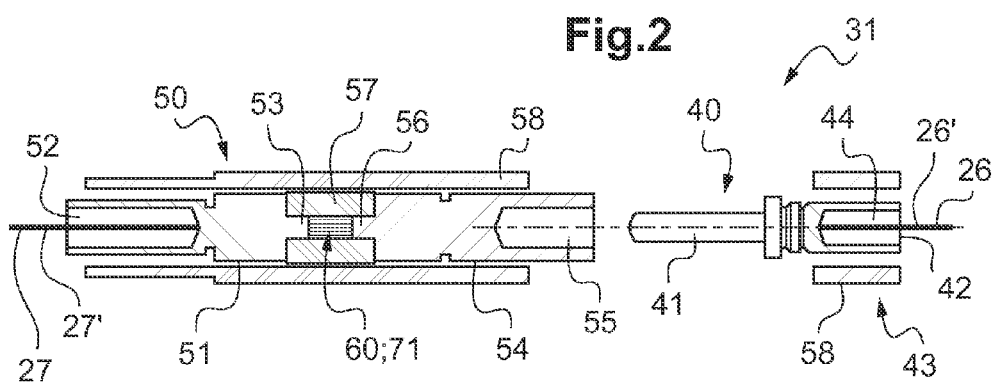
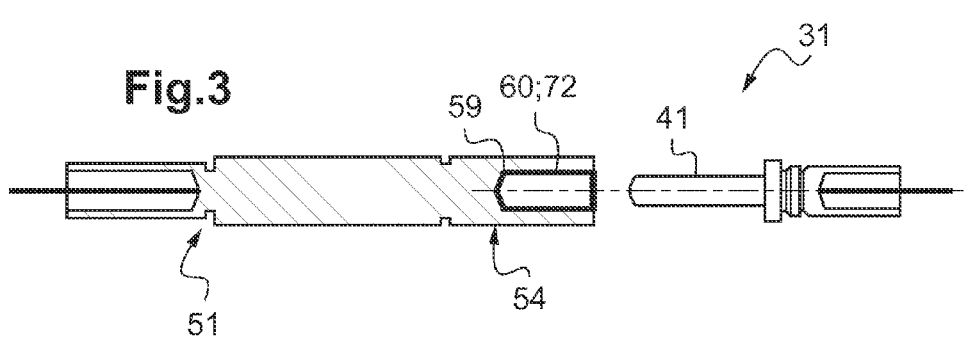

AIRCRAFT HAVING AN AVIONICS SYSTEM INCLUDING AVIONICS EQUIPMENT THAT HAS PRIMARY LIGHTNING PROTECTOR AND IS CONNECTED IN SERIES VIA WIRED CONNECTION TO SUPPLEMENTAL LIGHTNING PROTECTOR

CROSS REFERENCE TO RELATED APPLICATION

This application claims priority to French patent application No. FR 14 00667 filed on Mar. 20, 2014, the disclosure of which is incorporated in its entirety by reference herein.

BACKGROUND OF THE INVENTION (1) Field of the Invention

The present invention relates to an aircraft having an avionics system adapted in particular for withstanding lightning strikes. The invention is thus situated in the narrow technical field of systems that might be subjected to lightning strikes.

(2) Description of Related Art

An aircraft may include an avionics system, usually an avionics system including pieces of electronic and/or electrical and/or computer equipment connected together by wired connections, and in particular by electrical connections.

By its very nature, an aircraft is liable to be struck by lightning while in flight.

Such an impact generates indirect effects including generating transient electric currents flowing through the avionics system. Such a transient current possesses a high voltage and high energy.

Consequently, specifications for equipment in an avionics system may require a manufacturer to incorporate a protection system for providing protection against such transient currents.

In particular, avionics equipment may include a diode for suppressing transient voltages solely for the purpose of protecting the circuit. Such a diode may be considered to be a protective component of the surge suppressor type.

The avionics equipment is then protected against transient currents as predetermined by a specification.

Nevertheless, such transient currents may have characteristics that differ strongly from one aircraft to another.

In particular following a lightning strike, a transient current flowing in an avionics system of an aircraft having a metal structure differs from the transient current that would flow in an avionics system of an aircraft having a structure made of composite material.

Avionics equipment that is designed for an aircraft of metal structure is likely not to satisfy the specifications imposed for equipment on board an aircraft having a composite material structure.

This aspect can raise problems for a manufacturer, e.g. seeking to have uniform equipment installed over a wide range of aircraft.

At present, an aircraft manufacturer seeking to make an aircraft with a composite material structure can implement three different approaches.

The natural first approach consists in modifying the avionics equipment for a metal structure aircraft so as to enable it to be used on a composite material structure aircraft. The avionics equipment is modified so as to include a protection system against the levels of transient current that are to be expected on an aircraft with a structure made of composite material.

For example, the transient voltage suppressor diode of an avionics equipment may be replaced by a diode that corresponds to the new specifications.

This first approach is effective, but it can lead to costs that are relatively high. These costs include the costs of developing the new equipment, and also costs associated with managing new stock numbers specifying the new pieces of equipment.

Given the relatively large number of avionics equipment, these costs can thus be considerable.

A second approach consists in using pieces of avionics equipment that are not protected against the transient currents to which they might be subjected in flight, in particular as a result of a lightning strike.

In parallel, the manufacturer fits the avionics system with specific protection units connected in series in the wired connections. These protection units then include devices for protecting avionics equipment against destructive transient currents.

This second approach is also expensive, since it requires a plurality of protection units that are dedicated to protecting avionics equipment, which protection units are also heavy.

Like the second approach, a third approach consists in using avionics equipment that are not protected against the transient currents to which they might be subjected in flight.

In parallel, the manufacturer fits the wired connections of the avionics equipment with connectors that include devices for protecting the avionics equipment against destructive transient currents.

Such a connector thus seeks to suppress a transient current, and in particular to protect an avionics equipment that does not have its own protection.

Using such connectors can turn out to be expensive.

In particular, Document EP 0 512 927 B1 describes a set of transient current suppressor contacts. That set includes a multilayer thyristor having an active electrode and a ground electrode.

Document U.S. Pat. No. 5,846,099 does not belong to the technical field of avionics equipment to which the present invention relates. That Document U.S. Pat. No. 5,846,099 describes a connector having a diode-thyristor.

Document US 2013/171852 and Document EP 2 551 771 present avionics architectures.

Document US 2010/123591 presents a connector between two threaded ends. The connector includes an anti-explosion barrier and a printed circuit.

Document US 2003/0179533 describes a device for providing protection against voltage surges.

Also known is Document US 2010/127193.

BRIEF SUMMARY OF THE INVENTION

An object of the present invention is thus to propose an aircraft having a novel avionics system tending to withstand the indirect effects of a lightning strike.

Such an aircraft is provided with a structure and an avionics system, the avionics system comprising a plurality of avionics equipment and a system of connections between the avionics equipment, the avionics equipment transmitting and receiving input and output signals, and for each input and output signal including protection means for providing protection against indirect effects of lightning, the system of connections including wired connections and connectors between the wired connections.

The avionics system includes at least one avionics equipment referred to as "insufficiently protected equipment", said insufficiently protected equipment having protection means including at least one semiconductor member that is insufficient for ensuring that said insufficiently protected equipment is completely protected against the indirect effects of lightning given a predetermined specification relating to incorporating this insufficiently protected equipment in the structure, each insufficiently protected equipment being connected to at least one connector referred to as a "resistive" connector that includes a resistor arranged in series with at least one wired connection secured to the resistive connector.

By way of example, an insufficiently protected equipment may be avionics equipment mounted on board an aircraft having a metal structure. The insufficiently protected equipment can then be provided with protection means that are not sufficient against the effects of lightning given the predetermined specification of a manufacturer when the insufficiently protected equipment is placed on board an aircraft having a structure that is made of composite material, for example. The protection means comprise a semiconductor member, such as a diode for example.

Consequently, such insufficiently protected equipment is provided with protection that is not sufficient for its use in an aircraft having a particular structure, and thus for complying with the specification of the manufacturer of the aircraft.

In this context, the term "insufficient for ensuring that said insufficiently protected equipment is completely protected against the indirect effects of lightning" refers to an equipment having protection means that do not guarantee that this equipment has the ability to withstand the transient currents generated by lightning within that structure.

The natural response of the person skilled in the art would then be to modify the protection means of such an equipment that is insufficiently protected.

The invention goes against that reasoning by arranging a resistor in at least one connector connected to the insufficiently protected equipment. The resistor is connected in series in the electric cabling connected to the connector in order to ensure that the transient current passing through the connector also passes through the resistor.

In particular, a resistor may be fastened to the wired connection that is connected directly to an insufficiently protected equipment. Nevertheless, it is also possible for a resistor to be incorporated in a "stop" connector that is arranged between two different zones of an aircraft.

On its own, the resistor does not have the function of protecting an avionics equipment against the effects of lightning. Indeed a resistor cannot be considered as corresponding to the diodes that are used for that purpose. However each resistor provides assistance to the insufficient protection means of an avionics equipment.

The resistor may have resistance lying in the range 1 ohm ($\Omega$) to 5$\Omega$.

The resistor thus comprises an electrically resistive member, generally presenting resistance lying in the range 1$\Omega$ to 5$\Omega$. The resistive member is thus a two-terminal electrical component, or an electronic component, or block of material that gives rise to the required resistance.

The resistor may comprise electrically resistive material such as carbon.

Each resistor serves to dissipate at least some of the energy induced by a transient current as a result of a lightning strike. Under such circumstances, the protection means that are underdimensioned for given use of an insufficiently protected equipment may turn out to be sufficient to avoid damage to that insufficiently protected equipment.

Furthermore, it can be understood that the invention can be implemented relatively easily. Incorporating a resistor in a connector can potentially be performed while giving rise to little extra cost.

The invention also provides a degree of flexibility in matching the resistance value used to requirements.

Incorporating resistors in series in connectors on board an aircraft in order to combat the indirect effects of lightning is not at all obvious.

It should be recalled that such incorporation goes against existing natural prejudices.

Furthermore, such incorporation has a non-negligible influence on the overall electrical resistance of wired connections. The person skilled in the art might then consider that such an arrangement runs the risk of leading to malfunctions under normal conditions of use.

Nevertheless, the Applicant has found that incorporating such resistors is physically possible, by adapting, if necessary, the size of the wires of the wired connections or by reducing the length of the wired connections, for example.

The aircraft may also include one or more of the following additional characteristics.

Thus, when the aircraft has predetermined zones for connecting wired connections, the resistive connectors may be arranged in said predetermined zones.

This characteristic seeks to group connectors having resistors together in common zones. This characteristic serves to facilitate maintenance and modification of the avionics system.

Furthermore, a resistive connector comprises a male member and a female member, the male member being insertable in part and in reversible manner in the female member, and the resistor is arranged in the female member. For example, one of said male and female members is connected to a wired connection, while the other member is connected to another wired connection or to an equipment. The female member is advantageously connected to a wired connection with the male member being connected either to another wired connection or else to an equipment.

A connector usually has a male contact and a female contact. The male contact may be fastened to the structure of the aircraft, with the female contact then representing a member that is movable in order to be engaged on the male contact. This characteristic tends to minimize any risk of the connector being damaged. The resistor is then arranged in the female member of a connector.

This characteristic makes it possible in particular to limit development costs, since there is no need to modify the male member of the connector.

In a first embodiment, the female member has an electrically conductive rear portion that is secured for example to one end of a wired connection, and an electrically conductive front portion having a front orifice into which the electrically conductive male contact of a male member is inserted. The resistor of the connector is then inserted between the rear portion and the front portion, being electrically in contact with both the rear portion and the front portion.

Each orifice may be substantially cylindrical in shape.

A transient electric current passing through the connector then necessarily passes through the resistor.

For example, the resistor may be inserted in an electrically insulating sheath that projects longitudinally from opposite ends of said resistor, the sheath being secured to the rear portion and to the front portion.

The sheath may be a rigid or flexible hollow tube, and it may be substantially cylindrical in shape.

Under such circumstances, the resistor is arranged within the sheath. Furthermore, the front portion and the rear portion of the connector are secured to the sheath, each of them remaining in contact with the resistor. For example, the front portion and the rear portion may also be inserted into the sheath at opposite ends of the resistor.

The sheath thus serves to secure the front portion to the rear portion. Since the sheath is electrically insulating, the current passing through the connector necessarily passes through the resistor.

The sheath may be made of any electrically insulating material.

The resistor may also comprise a block of electrically resistive material inserted in the sheath and in contact with the front portion and with the rear portion. Such a block of material may be a block of carbon.

In a second embodiment, the female member has an electrically conductive rear portion, which may for example be secured to one end of said second wired connection, and an electrically conductive front portion having a front orifice into which an electrically conductive male contact of a male member is inserted, the resistor being inserted in the front orifice in order to be interposed between the female member and the male contact, the front portion being secured to the rear portion.

Optionally, the resistor comprises a bushing pressed against a wall of the front portion defining the front orifice, the bushing being open in order to receive the male contact.

BRIEF DESCRIPTION OF THE SEVERAL VIEWS OF THE DRAWINGS

The invention and its advantages appear in greater detail from the context of the following description of examples given by way of illustration and with reference to the accompanying figures, in which:

FIG. 1 is a diagram showing an aircraft of the invention;

FIG. 2 is a section of a connector in a first embodiment; and

FIG. 3 is a section of a connector in a second embodiment.

Elements present in more than one of the figures are given the same references in each of them.

DETAILED DESCRIPTION OF THE INVENTION

FIG. 1 shows an aircraft 1 having a structure 2. The aircraft 1 may be a rotorcraft, and the structure 2 then carries a rotary wing 3. The structure 2 may be made out of metal materials or out of composite materials.

The aircraft 1 is provided with an avionics system 10 including a plurality of pieces of avionics equipment 15 named avionics equipment connected together by a system of connections 20. This system of connections 20 possesses a plurality of wired connections 25 and of connectors 30.

Each avionics equipment 15 delivers outward signals to the wired connections and it receives input signals over the wired connections.

In addition, each avionics equipment 15 includes protection means 16 so as to be protected at least to some extent against transient currents induced by lightning strikes. Such protection means are conventional means, e.g. having a diode for suppressing transient voltages. If necessary, reference may be made to the literature in order to obtain more information.

Nevertheless, certain avionics equipment may include protection means that are underdimensioned in the face of requirements resulting from the avionics equipment being arranged within a particular structure.

Such avionics equipment is said to be an "insufficiently protected equipment" 17.

Avionics equipment that includes protection means appropriate for the requirements that result from the avionics equipment being arranged within a particular structure are referred to as "sufficiently protected equipment" 18. The avionics system might not have any.

In addition to incorporated protection means, the avionics system may include at least one connector 30 referred to as a "resistive connector" 31. For example, each insufficiently protected equipment 17 is connected directly or indirectly via a wired connection to a resistive connector 31.

Such a resistive connector 31 includes a resistor 60 that is connected in series with at least one wired connection secured to the resistive connector, and for example between two wired connectors 25 secured to the resistive connector 31. The resistor may be obtained using an electrical resistive material such as carbon.

The inside of the aircraft might possibly be subdivided into a plurality of zones 4, 5, and 6, in which the resistive connectors are more particularly located.

Independently of the embodiment, and with reference to FIG. 2, a connector and in particular a resistive connector 31 may comprise a male member 40 and a female member 50.

The resistor 60 is then advantageously located in the female member, which represents the movable member of the connector for handling by an operator.

The male member extends longitudinally from a rear segment 42 towards a male contact 41. The rear segment 42 and the male contact 41 together form an electrically conductive part, e.g. a single part.

By way of example, the rear segment 42 may then be secured to one end 26' of a first wired connection 26. This first wired connection 26 may, for example, be crimped in an opening 44 in the rear segment 42. The rear segment can thus be connected to an equipment connection of an equipment.

The male contact 41 may for example be in the shape of a cylinder.

Furthermore, the female member 50 has a rear portion 51 that is electrically conductive and that is secured by way of example to one end 27' of a second wired connection 27.

By way of example, the rear portion 51 includes a rear orifice 52 in which one end 27' of the second wired connection 27 is inserted.

In addition, the female member 50 has a front portion 54 that is electrically conductive. This front portion 54 is provided with a front orifice 55 into which the male contact 41 of the male member of the connector can be inserted.

In the first embodiment shown in FIG. 2, the resistor 60 of a resistive connector is arranged in the female member between the rear portion 51 and the front portion 54. Furthermore, this resistor is electrically in contact with the rear portion 51 and with the front portion 54.

The resistor 60 is pressed into an electrically insulating sheath 57. This sheath projects longitudinally from opposite ends of the resistor 60 so as to define a rear passage and a front passage at opposite ends of the resistor.

Under such circumstances, the sheath 57 is secured to the rear portion 51, this rear portion having a rear peg 53 passing along said rear passage in order to reach the resistor. Likewise, the sheath 57 is secured to the front portion 54, the front portion having a front peg passing along said front passage in order to reach the resistor.

Optionally, the resistor 60 comprises a block 71 of electrically resistive material inserted in the sheath 57.

Independently of the embodiment, conventional covering means 58 may cover the female member and/or the male member, at least in part.

FIG. 3 shows a second embodiment.

In this second embodiment, the rear portion 51 and the front portion 54 of the female member 50 can be secured to each other. For example, the rear portion 51 and the front portion 54 form a single piece.

Under such circumstances, the resistor 60 of the resistive connector is inserted in the front orifice 55 of the front portion. For example, the resistor 60 comprises an electrically resistive bushing 72 inserted in the front orifice. The bushing is then pressed against the wall 59 of the front portion 54 defining the front orifice 55.

Furthermore, the bushing 72 is open at one end in order to be able to receive the male contact 41 of the male member.

Naturally, the present invention may be subjected to numerous variations as to its implementation. Although several embodiments are described above, it will readily be understood that it is not conceivable to identify exhaustively all possible embodiments. It is naturally possible to envisage replacing any of the means described by equipment means without going beyond the ambit of the present invention.

What is claimed is:

1. An aircraft comprising:
   a structure;
   an avionics system including a plurality of pieces of avionics equipment and a system of connections between the pieces of avionics equipment, the pieces of avionics equipment configured to transmit and receive input and output signals with one another over the system of connections, the system of connections including wired connections connected to the pieces of avionics equipment and connectors secured between the wired connections;
   at least one of the pieces of avionics equipment including protection means including at least one semiconductor member for providing protection against indirect effects of lightning;
   wherein at least one piece of avionics equipment is referred to as a piece of "insufficiently protected equipment" in that the protection means of the piece of insufficiently protected equipment is insufficient for ensuring that the piece of insufficiently protected equipment is completely protected against the indirect effects of lightning given a predetermined specification relating the integration of the piece of insufficiently protected equipment in the structure; and
   wherein each piece of insufficiently protected equipment is connected to at least one connector referred to as a "resistive" connector that includes a resistor arranged in series with the wired connections secured to the resistive connector whereby the resistor supplements the protection against indirect effects of lightning.

2. The aircraft according to claim 1, wherein the aircraft has predetermined zones for connecting wired connections, and the resistive connectors are arranged in the predetermined zones.

3. The aircraft according to claim 1, wherein the resistive connector comprises a male member and a female member, the male member being insertable in part and in reversible manner in the female member, and the resistor is arranged in the female member.

4. The aircraft according to claim 3, wherein the female member has an electrically conductive rear portion and an electrically conductive front portion with a front orifice into which an electrically conductive male contact of a male member is inserted, the resistor being inserted between the rear portion and the front portion so as to be electrically in contact with the rear portion and with the front portion.

5. The aircraft according to claim 4, wherein the resistor is inserted in an electrically insulating sheath projecting longitudinally from opposite ends of the resistor, the sheath being secured to the rear portion and to the front portion.

6. The aircraft according to claim 5, wherein the resistor comprises a block of electrically resistive material inserted in the sheath and in contact with the front portion and with the rear portion.

7. The aircraft according to claim 3, wherein the female member has an electrically conductive rear portion and an electrically conductive front portion having a front orifice into which an electrically conductive male contact of a male member is inserted, the resistor being inserted in the front orifice in order to be interposed between the female member and the male contact, the front portion being secured to the rear portion.

8. The aircraft according to claim 7, wherein the resistor comprises a bushing pressed against a wall of the front portion defining the front orifice, the bushing being open in order to receive the male contact.

9. The aircraft according to claim 1, wherein the resistor comprises electrically resistive material.

10. The aircraft according to claim 9, wherein the material comprises carbon.

11. The aircraft of claim 1 wherein:
    the at least one semiconductor member of each piece of avionics equipment includes a diode.

12. An aircraft comprising:
    a structure;
    an avionics system including a plurality of pieces of avionics equipment and a system of connections between the pieces of avionics equipment, the pieces of avionics equipment configured to transmit and receive input and output signals with one another over the system of connections, the system of connections including wired connections directly connected to the pieces of avionics equipment and connectors secured between the wired connections;
    at least one of the pieces of avionics equipment including a semiconductor member for providing protection against indirect effects of lightning;
    wherein at least one of the pieces of avionics equipment is referred to as a piece of "insufficiently protected equipment" in that the semiconductor member of the piece of insufficiently protected equipment is insufficient for ensuring that the piece of insufficiently protected equipment is completely protected against the indirect effects of lightning given a predetermined specification relating the integration of the piece of insufficiently protected equipment in the structure; and
    wherein, for each piece of insufficiently protected equipment, the connector secured to the wired connection directly connected to the piece of insufficiently protected equipment is referred to as a "resistive" connector in that the resistive connector includes a resistor arranged in series with the wired connection secured to the resistive connector whereby the resistor supplements the protection against indirect effects of lightning.

13. The aircraft of claim 12 wherein:
the semiconductor member of each piece of avionics equipment includes a diode.

14. An avionics system for an aircraft, the avionics system comprising:
a plurality of pieces of avionics equipment, at least one of the pieces of avionics equipment including a semiconductor member for providing protection against indirect effects of lightning;
a system of connections between the pieces of avionics equipment, the system of connections including wired connections connected to the pieces of avionics equipment and connectors secured between the wired connections; and
wherein one of the connectors secured between the wired connections connected between a pair of the pieces of avionics equipment includes a resistor arranged in series with the wired connections secured to the one of the connectors whereby the resistor supplements the protection against indirect effects of lightning for at least one of the pair of the pieces of avionics equipment.

15. The avionics system of claim 14 wherein:
the semiconductor member of each piece of avionics equipment includes a diode.

* * * * *